No. 683,127. Patented Sept. 24, 1901.
F. LONG.
ROCK DRILL CHUCK.
(Application filed July 6, 1900.)
(No Model.)
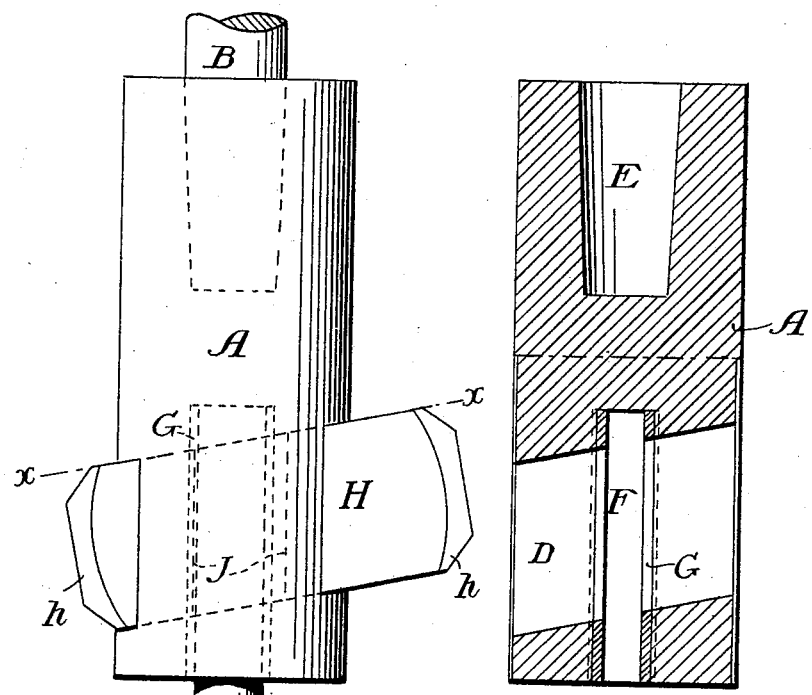
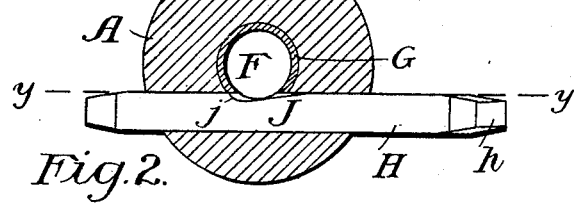
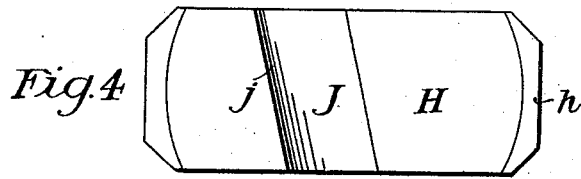
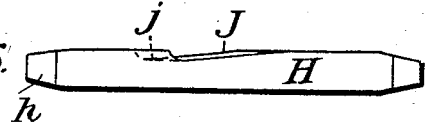
Witnesses:
W. C. Pinckney
C. Holloway
Inventor:
Frederick Long,
By J. E. M. Bowen
Attorney

UNITED STATES PATENT OFFICE.

FREDERICK LONG, OF FOOTSCRAY, VICTORIA.

ROCK-DRILL CHUCK.

SPECIFICATION forming part of Letters Patent No. 683,127, dated September 24, 1901.

Application filed July 6, 1900. Serial No. 22,663. (No model.)

*To all whom it may concern:*

Be it known that I, FREDERICK LONG, a subject of the Queen of Great Britain, residing at Hopkins street, Footscray, in the Colony of Victoria, Australia, have invented certain new and useful Rock-Drill Chucks, of which the following is a specification.

This invention has been devised to provide improved means by or through the medium of which the chucks of drills and the like instruments used for drilling or operating in rocks are quickly and efficiently secured to the shanks of the bits or cutters.

In order to make the invention clear, I will refer in the following description to the accompanying sheet of drawings, in which—

Figure 1 shows the chuck in elevation; Fig. 2, a cross-section of same, taken on $xx$ of Fig. 1. Fig. 3 shows a longitudinal section of chuck-block, the lower portion of which is taken on $yy$ of Fig. 2. Figs. 4 and 5 show face and edge view of the key detached.

I employ a cylindrical body A, of steel or other suitable metal, bored at both ends to receive, respectively, the piston-rod or other suitable operating-rod B and the shank C of the bit and having at the bit end a keyway D cut in and through same and a little to one side. (See Fig. 2.) The bore E, into which the operating-rod end is fitted, is tapered, while the bore F at the opposite end of the chuck A is provided with a metallic bushing or liner-tube G. Into this bushing the shank C of the bit is arranged to fit as perfectly as possible without jamming. The keyway D is cut in a slightly-oblique direction through the chuck and liner, but a little to one side, and a specially-constructed key H is provided to form a lock or engagement between the chuck and the shank of the bit.

The key, Figs. 4 and 5, is somewhat of a parallelogram in proportions, and has about its center an incut slot or step J about halfway down the length of its face. The cut begins from its face and gradually proceeds down until the full depth of such step is reached. I would have it understood that this incut or step should terminate at its bottom or lowest point $j$ in a slight curve. This incut or step is incised right across the entire face of the key and lies at an incline, such incline being calculated to agree with the angle at which the shank of the bit is set relatively with the inclined slotted keyway cut through the chuck, hereinafter referred to, and so that it will, when the key is in the keyway, be parallel with bore F in the chuck. The key is tapered at its ends $h$ for convenience in inserting it in the keyway.

For securing the parts in position the specially-constructed key H is entered into the slotted keyway and introduced so that the deepest portion $j$ of the incision is in a lower position than the shallower portion of same and so that the incision will lie beside the bore F, and the key will not interfere with the bore-circle. When in this position, (see Fig. 2,) the shank C may be inserted in place. In order to form a tight engagement between the chuck, the bit-shank, and the key, the latter is hammered or tapped at its higher end, which will cause the shallower portion of the incision J to project slightly into the bore F, and thus coming in contact with the shank C will securely wedge same in position in the chuck. In reverse manner the parts are loosened by tapping or knocking the lower end of such key, so as to release its hold upon the shank.

I have illustrated a chuck having a round section; but it will be readily understood that it may be of octangular, square, or other suitable section.

By experiment I have found that where the chuck is about four inches in length the key should be about one inch in width by about three inches in length and about five-eighths of an inch in depth. The slot in the key should be about three-sixteenths of an inch in depth at its lowest part and gradually taper to the face of key.

By inclining the keyway as described the key during use when the chuck is operating vertically, or approximately so, or with the entering end of the wedge down, as it is ordinarily, will under the combined effect of gravity and concussion work forward rather than backward, thereby increasing the strength of the hold on the bit-shank.

Having now particularly described and ascertained the nature of my said invention and in what manner the same is to be performed, I declare that what I claim is—

1. In combination, a chuck having a bore for a bit-shank, and a keyway through the chuck inclined in relation to said bore and communicating with the chuck-bore, a bit-shank, and a key for the inclined keyway having an incision across its inner face parallel with the bore for the bit-shank and gradually deepening from the inner face of the key to a depth such that when the deepest part of the incision is beside the bore the key does not project into the bore and hence does not clamp the bit-shank, said key however wedging the bit-shank when the key is driven forward, substantially as described.

2. In combination a chuck having tapered bore for piston-rod, bore for bit-shank and inclined keyway communicating with bit-shank bore, a bit-shank, and a key having an incision set at an angle on face of key and which is gradually deepened from the face-level of key substantially as and for the purposes described.

In testimony whereof I have signed my name to this specification in the presence of two subscribing witnesses.

FREDERICK LONG.

Witnesses:
A. O. SACHSE,
A. HARKER.